July 16, 1946.  H. A. DUTCHER  2,404,280
PRODUCTION OF UNSATURATED NITRILES
Filed Dec. 9, 1943
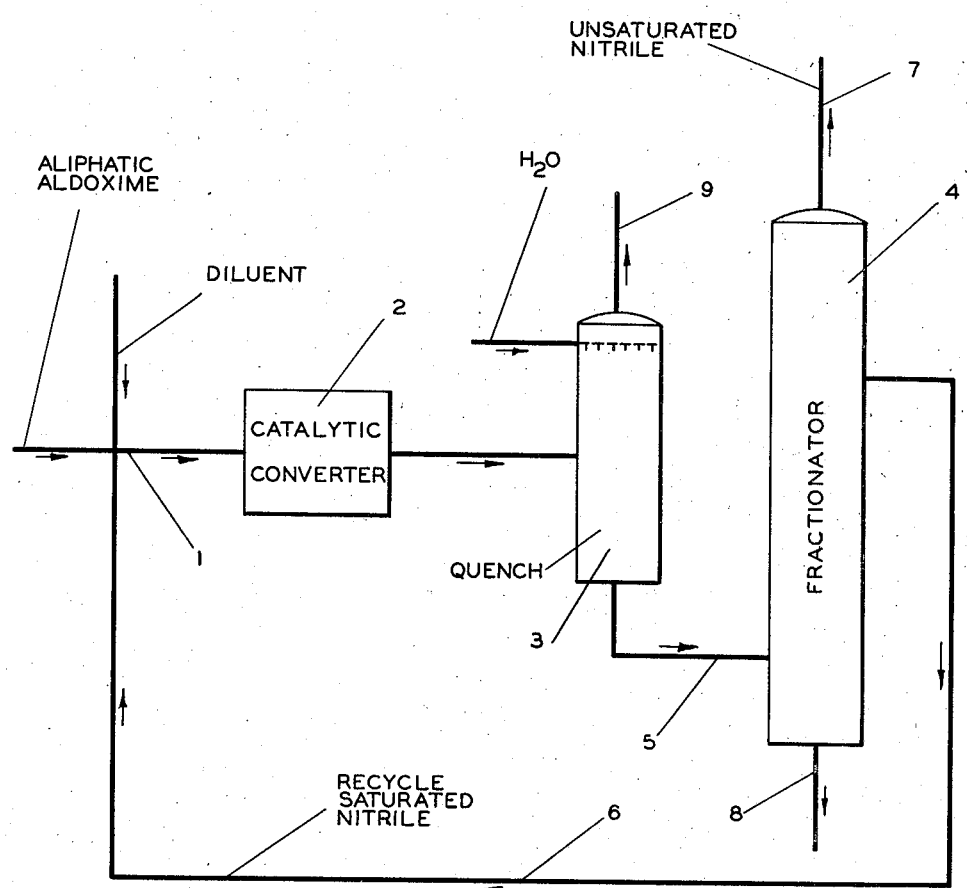
INVENTOR
H. A. DUTCHER
BY Hudson, Young & Yinger
ATTORNEYS Patented July 16, 1946

2,404,280

UNITED STATES PATENT OFFICE 2,404,280

PRODUCTION OF UNSATURATED NITRILES

Harris A. Dutcher, Bartlesville, Okla., assignor to Phillips Petroleum Company, a corporation of Delaware Application December 9, 1943, Serial No. 513,568

9 Claims. (Cl. 260—464)

This invention relates to the production of unsaturated nitriles. More specifically it is concerned with the formation of acrylonitrile and its homologs by the simultaneous dehydration and dehydrogenation of aldehyde oximes.

The dehydration of aldehyde oximes to form saturated nitriles is a well-known chemical reaction, usually accomplished by treating the oximes with acetic anhydride of acetyl chloride. The formation of saturated nitriles among other products, by passing ketoximes over thoria or alumina at 350–380° C., has been reported. (Mailhe and de Godon, Bull. soc. chim. 23, 18–30 (1918).). So far as I am aware, however, the formation of unsaturated nitriles by the simultaneous dehydration and dehydrogenation of aldehyde oximes has not been accomplished heretofore.

The object of my invention is to provide a process for the production of unsaturated nitriles from saturated aliphatic aldehyde oximes.

A further object of my invention is to provide a process for the production of acrylonitrile from propionaldehyde oxime, or α-methyl acrylonitrile from isobutyraldehyde oxime.

The process of my invention is carried out by passing the vapors of an aliphatic saturated aldehyde oxime, for example, propionaldehyde oxime, over a catalyst of the type which promotes both dehydration and dehydrogenation reactions, at a temperature in the dehydrogenation range. Catalysts comprising a major proportion of Activated Alumina or bauxite and a minor proportion of the lower oxides of chromium, molybdenum, vanadium, or tungsten, are employed in my process. The preferred catalyst is composed of the mineral bauxite impregnated with a small per cent, say from 5 to 30%, of chromium sesquioxide, $Cr_2O_3$. Such catalysts are readily prepared in various ways well known to the art. The pressure in the catalyst zone may be varied over a rather wide range, typically from slightly below atmospheric to 50 pounds per sq. in. gauge, but it is more convenient to operate at substantially atmospheric pressure. It is preferable to use a pressure just sufficiently above atmospheric to maintain the desired flow rate. Low partial pressures of the reactants are advantageous. This may be attained by using an inert diluent gas such as steam or nitrogen.

The desired dehydration-dehydrogenation reaction may be carried out at temperatures within the range 700 to 1100° F. or even higher, however, a range of from 700 to 900° F. is generally preferred. The flow of reactant vapors through the catalyst chamber is preferably maintained at a rate such that an economical conversion per pass is obtained without an excessive amount of dehydrogenation or polymerization. A contact time ranging from 1 to 5 seconds is generally satisfactory. Insufficiently dehydrogenated products, such as propionitrile, may be readily separated from the effluents and recycled, thereby increasing the ultimate yield of acrylonitrile. Too severe conditions may lead to the formation of the nitrile of propiolic acid, $CH{\equiv}C{-}CN$.

Rapid cooling of the reaction products is desirable, and in a preferred method of accomplishing this result the effluents are subjected to a direct water quench, after which the acrylonitrile and other products are recovered by fractional distillation.

The aldehyde oximes to be employed in my process may be prepared by any convenient method, such as the reaction of the aldehyde with hydroxylamine hydrochloride. The method of preparing the oximes is not a part of my invention.

The accompanying drawing shows in schematic form one specific embodiment of my invention. An aldehyde oxime, preferably in admixture with a suitable diluent gas, is fed via line 1 into catalytic converter 2 where it contacts a dehydrating-dehydrogenating catalyst at a temperature of from 700 to 900° F. The effluents from catalytic converter 2 are conducted to quenching means 3 where they are quickly cooled preferably by water to the temperature desired at the entrance to separating means 4, to which they are carried by line 5. The aforementioned temperature is, of course, sufficiently below the reaction temperature that no further reactions take place. Separation of the unsaturated nitrile from any saturated nitriles and other products may be readily accomplished by fractional distillation of the stream from quenching means 3. It is preferred to carry out the dehydration-dehydrogenation under conditions such that excessive dehydrogenation is avoided, even though this may result in the presence of some of the saturated nitrile in the effluent from the catalyst chamber. This material may be readily recycled to the dehydration-dehydrogenation zone, via line 6, if it is desired to increase the yield of unsaturated nitrile. The unsaturated nitrile is removed via line 7, and any high boiling polymers or other by-products are withdrawn through line 8. Hydrogen gas is vented from the system through line 9 in the top of quenching means 3.

Example

Propionaldehyde oxime, B. P. 130–132° C. was vaporized and passed continuously over a catalyst comprising principally bauxite with a minor proportion of chromium sesquioxide, at a temperature of 800° F. The products were cooled by a direct water quench, acrylonitrile and propionitrile being subsequently recovered and separated by fractional distillation. Propionitrile was recycled to the catalyst chamber for further dehydrogenation. Acrylonitrile was obtained in good yield.

I claim:

1. The process of making acrylonitrile which comprises passing the vapors of propionaldehyde oxime over a dehydrating-dehydrogenating catalyst composed of chromium sesquioxide supported on bauxite at a temperature of from 700 to 900° F.

2. The process of making α-methyl acrylonitrile which comprises passing the vapors of isobutyraldehyde oxime over a dehydrating-dehydrogenating catalyst composed of chromium sesquioxide supported on bauxite at a temperature of from 700 to 900° F.

3. The process of making an aliphatic unsaturated nitrile of 3 to 4 carbon atoms per molecule which comprises passing the vapors of the corresponding aliphatic saturated aldehyde oxime over a dehydrating-dehydrogenating catalyst composed of chromium sesquioxide supported on alumina at a temperature in the dehydrogenation range, treating the reaction effluents to separately recover the unsaturated nitrile as the product of the process and the saturated nitrile contained in said effluents, and recycling said saturated nitrile to the catalytic conversion zone.

4. The process of making an aliphatic unsaturated nitrile of 3 to 4 carbon atoms per molecule which comprises passing the vapors of the corresponding aliphatic saturated aldehyde oxime over a dehydrating-dehydrogenating catalyst composed of chromium sesquioxide supported on alumina at a temperature in the dehydrogenation range, quenching the reaction effluents with water to quickly cool same to a temperature at which any further reactions are prevented, and fractionally distilling the resulting mixture to separately recover the unsaturated nitrile as the product of the process and the saturated nitrile contained in said effluents, and recycling said saturated nitrile to the catalytic conversion step.

5. The process of making an aliphatic unsaturated nitrile of 3 to 4 carbon atoms per molecule which comprises passing the vapors of the corresponding aliphatic saturated aldehyde oxime at a temperature within the range of 700 to 900° F. over a catalyst composed of chromium sesquioxide supported on bauxite effecting simultaneous dehydration and dehydrogenation of said oxime to the corresponding nitrile.

6. The process of making an aliphatic unsaturated nitrile of 3 to 4 carbon atoms per molecule which comprises passing the vapors of the corresponding aliphatic saturated aldehyde oxime at a temperature within the range of 700 to 900° F. and at substantially atmospheric pressure into contact with a catalyst composed of chromium sesquioxide supported on bauxite effecting simultaneous dehydration and dehydrogenation of the aliphatic saturated aldehyde oxime to the corresponding aliphatic unsaturated nitrile.

7. The process of making an aliphatic unsaturated nitrile of 3 to 4 carbon atoms per molecule which comprises contacting the vapors of the corresponding aliphatic saturated aldehyde oxime at a temperature within the range of 700 to 900° F. and at a pressure within the range of substantially atmospheric pressure to about 50 pounds per square inch gage into contact with a catalyst composed of chromium sesquioxide supported on alumina for a period of time within the range of 1 to 5 seconds such as to simultaneously dehydrate and dehydrogenate the aliphatic saturated aldehyde oxime to the corresponding aliphatic unsaturated nitrile.

8. The process of making an aliphatic unsaturated nitrile of 3 to 4 carbon atoms per molecule which comprises contacting the vapors of the corresponding saturated aliphatic aldehyde oxime with a dehydrating-dehydrogenating catalyst comprising aluminum oxide and a minor proportion of a material selected from the group consisting of the oxides of chromium, molybdenum, vanadium and tungsten at a temperature within the range of 700 to 900° F. thereby effecting conversion of the aliphatic saturated aldehyde oxime to the corresponding aliphatic unsaturated nitrile.

9. The process of making an unsaturated nitrile which comprises contacting the vapors of an aliphatic saturated aldehyde oxime over a dehydrating-dehydrogenating catalyst composed of aluminum oxide and a minor proportion of a material selected from the group consisting of the oxides of chromium, molybdenum, vanadium and tungsten at a temperature within the range of 700 to 1100° F.

HARRIS A. DUTCHER.